May 8, 1962　　　E. E. LEWIS ETAL　　　3,034,034
ELECTRICAL GENERATING SYSTEM
Filed Dec. 28, 1959
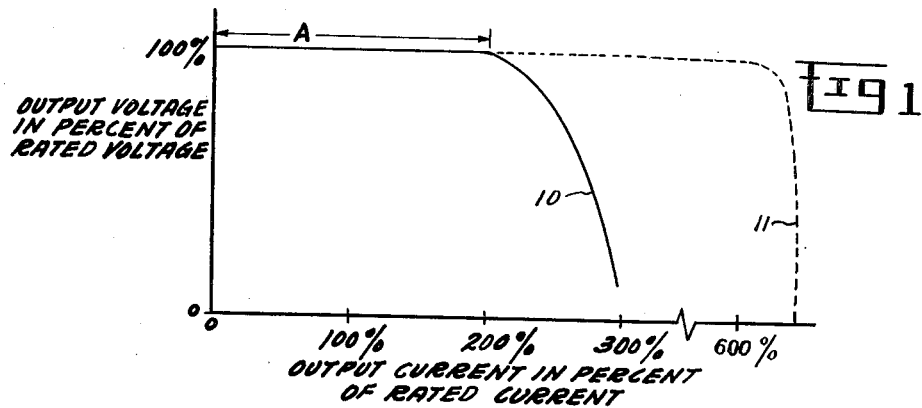
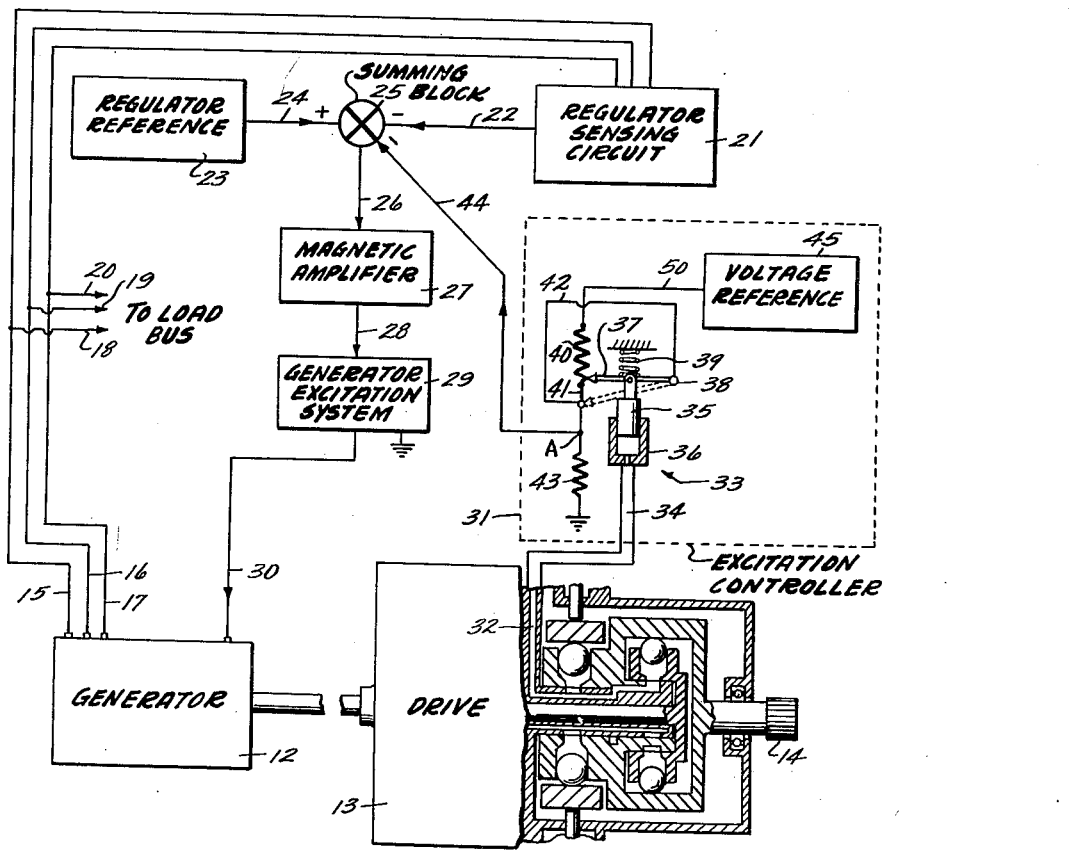
INVENTORS:
ERNEST E. LEWIS
SAMUEL C. CALDWELL
By Lawrence G. Norris
ATTORNEY

United States Patent Office

3,034,034
Patented May 8, 1962

3,034,034
ELECTRICAL GENERATING SYSTEM
Ernest E. Lewis, Topsfield, Mass., and Samuel C. Caldwell, Waynesboro, Va., assignors to General Electric Company, a corporation of New York
Filed Dec. 28, 1959, Ser. No. 862,391
6 Claims. (Cl. 322—23)

Our invention relates to electrical generating systems and in particular to systems of the type in which an electrical generator is driven by constant speed drive such as an air turbine, a variable speed ratio hydraulic transmission or the like.

Systems of the foregoing type are commonly used in aircraft, the typical installation involving an electrical generator driven at a substantially constant speed through a constant speed drive which in turn receives its driving power from one or more of the primary aircraft powerplants. Such systems are used extensively in jet engine and turboprop engine powered aircraft.

In operation, the generators may be electrically connected in parallel with each other to a common bus or they may be connected to supply individual loads depending on the requirements of the installation. The generator system usually includes a voltage regulator associated with each generator, the function of which is to control the excitation level of the generator to regulate the output voltage to some preselected level. It is generally a requirement for aircraft electrical systems of this type that the voltage regulator be capable of maintaining the rated voltage level at generator output current levels which are in excess of the rated current output, the typical requirement being up to 200 percent of rated current from 0.75 lagging to unity power factor for a period of 5 seconds. In other words, if the system sustains an overload for any reason, the voltage regulator is required to maintain the rated voltage level on the generator up to at least twice the rated capacity of the generator at all power factors between 0.75 lagging and unity.

Where a requirement of the above type exists, it is of course necessary that the regulating system be designed to meet the requirement over the full range of both regulator and generator operating environmental conditions. Generator excitation current requirements are the same for a given load condition for all generator temperatures but, since the generator field is usually wound with copper wire which may change in resistance by a factor as large as 2.7:1 over the generator field winding temperature range, the regulator must supply as much as 2.7 times as much voltage and power at the high temperature as is needed at low temperature. Thus, the regulator and excitation equipment designed to meet the overload requirement at high temperature has a capacity of up to 2.7 times the generator excitation required for the overload requirements at low temperature. As a result, the generating system is capable of supplying up to 6 times rated load at unity power factor when operating at low temperature.

Coupled with and resulting from the requirement placed on the voltage regulation system is a corresponding requirement on the drive that it be able to carry the maximum load placed on it by the generator. Thus, where the requirement on the generator and voltage regulation system is such that it be able to deliver rated voltage at 200 percent rated load at any power factor between 0.75 lagging and unity, the drive must be able to carry loads up to 200 percent of its normal rated capacity. However, where the voltage regulation system has no compensation in capacity for the great change in generator field requirements resulting from the large field temperature range, it has the capacity at lower operating temperatures to maintain rated voltage on the generator at output power substantially in excess of the normal rated value even though this capacity is not required. In the typical case, the low temperature capability of an uncompensated system allows it to maintain rated voltage at loads up to 600 percent of rated power. This makes it necessary to design the drive in a system of this kind to transmit leads in the vicinity of 600 percent of the normal rated load if complete coordination is to be obtained. It will be appreciated that the additional requirement imposed by the excess capacity of the voltage regulator system at the lower temperatures compromises the design of the drive (and of the engine supplying the drive) in that it requires the incorporation of large excess capacity over and above that which the electrical system itself would otherwise require.

Even at the high temperature condition, the requirement that 200 percent load be met at 0.75 lagging power factor gives the regulation system the capacity to supply approximately 300 percent load at unity power factor. Hence, full coordination would require some compromise in drive design even though the generator field temperature variation were not encountered.

In view of the foregoing, it is an object of our invention to provide an improved electrical generating system of the type utilizing a constant speed drive in which the drive and the voltage regulation system are interconnected to limit the capacity of the voltage regulation system to a preselected level as a function of the load imposed on the drive.

We accomplish this and other objects of our invention, in one embodiment thereof, by extracting from the drive a signal proportional to the load being transmitted by the drive and modifying the characteristics of the voltage regulation system as a function of the drive load signal. We compare the drive load signal with a reference signal representing a preselected drive load above which the modification of the voltage regulator characteristics is to occur. When the drive load signal is less than the reference load signal, the voltage regulation system operates without being affected by the drive load signal. However, when the drive load signal exceeds the reference level, a signal is introduced into the voltage regulation system in a direction to reduce excitation and to decrease generator output voltage, thereby limiting the load applied by the generator on the drive. In the embodiment of our invention presented herein, we utilize the drive pintle pressure of a hydraulic drive as a measure of the load being transmitted through the drive.

Other objects and advantages of our invention will become apparent from the following description taken in connection with the accompanying drawings, in which:

FIG. 1 is a graphical illustration of the voltage regulation characteristic of a typical electrical system, and FIG. 2 is a schematic presentation of an electrical system utilizing a hydraulic drive and embodying our invention.

Referring now to FIG. 1, we have depicted two voltage regulation characteristic curves 10 and 11 which are coincident over the range A. These curves show the relationship between generator output voltage in terms of percent of rated voltage as a function of generator output current in percent of rated current. The curve 10 is typical of the usual aircraft electrical system requirement in that 100 percent rated output voltage must be maintained by the regulation system at 0.75 lagging power factor up to 200 percent rated output current, above which the output voltage is permitted to drop off.

As has been previously explained, the necessity for meeting this requirement at maximum temperature conditions results in substantial excess capacity at the lower temperatures. In other words, an uncompensated regulating system having the characteristic represented by the curve 10 at maximum operating temperatures 0.75 lagging power factor would generally have a characteristic such as represented by the curve 11 at the minimum operating temperature and unity power factor. As has been pointed out, this requires that the drive be designed to have the capacity required to accommodate the characteristic represented by curve 11, which results in the incorporation of excess capacity above that which would otherwise be required to satisfy the electrical system requirements represented by the curve 10. Even at high temperature conditions, the system has substantial excess capacity over that represented by curve 10 when operated at unity power factor. Our invention provides a system in which the load imposed by the generator on the drive may be limited to some preselected characteristic, such as that represented by the curve 10, regardless of whether the voltage regulation system may have capacity which would otherwise impose a greater load on the drive.

Referring now to FIG. 2, there is shown an electrical generating system in which an electrical generator 12 is driven by a hydraulic drive 13, which in turn receives its input power through an input shaft 14 mechanically driven from a power source such as the rotor of a jet engine. The generator illustrated is of the three phase type having a three phase alternating voltage appearing across the output conductors 15, 16 and 17. The electrical output of the generator 12 is connected to a load bus (not shown) through conductors 18, 19 and 20 and to a voltage regulator sensing circuit represented by the block 21. The voltage regulator sensing circuit produces a direct current output voltage appearing at output 22 (represented schematically in one line diagram form). The output voltage produced by the regulator sensing circuit 21 is proportional to the magnitude of the generator output voltage. In the case of a three phase generator, the output of the regulator sensing circuit 21 may be made proportional to one of the phase or line voltages or to an average of the three phase or line voltages depending on the approach used. At any rate, the output of the sensing circuit is made proportional to the output voltage parameter of the generator 12 which represents the parameter to be regulated or controlled at the preselected level.

In order to establish the reference voltage level at which the generator output voltage is to be regulated, there is provided a regulator reference 23, the function of which is to produce a D.-C. output voltage of fixed magnitude at its output 24. The output of the regulator reference represents the reference level at which the generator output voltage is to be regulated.

The signal proportional to the generator output voltage and appearing at the output 22 of the sensing circuit 21 is subtracted from the reference signal produced by the regulator reference 23, as represented schematically by the summing block 25 together with the indicated signs. The output 26 of the summing block thus represents the difference between the actual output voltage of the generator 12 and the desired or reference voltage called for by the regulator reference 23.

The signal 26, which may be called an error signal, is fed into a magnetic amplifier 27 where it is amplified and delivered at 28 to the generator field or excitation system 29 to control the excitation level 30 of the generator 12. The polarity of the connections is such that an increase in the output voltage of the generator 12 above the reference level produces an error signal at 26 which is in a direction to reduce the excitation level of the generator and thereby return the generator output voltage to the reference level. Similarly a decrease in the generator voltage below the reference level produces an error signal which increases excitation to bring the voltage back up to the level established by the regulator reference 23.

Thus far, we have described those elements in FIG. 1 which form a typical voltage regulation system. As will now be described we provide an arrangement in which the characteristics of such a system are modified as a function of drive load torque.

Referring again to FIG. 1, we provide an excitation controller 31 which utilizes the drive pintle discharge pressure as a measure of drive torque. Since torque is transmitted through the drive through the hydraulic medium, the pintle discharge pressure is proportional to the torque being transmitted. This pressure is sensed at the pintle discharge line 32 of the drive and delivered to a transducer element 33 through a conduit 34. The transducer 33 comprises a piston 35 slidably mounted in a cylinder 36 and connected to control the position of a potentiometer wiper arm 37 which is pivotally mounted at 38. The wiper arm 37 is spring loaded by means of a compression spring 39 so that for any given pintle pressure delivered to the cylinder 36 through the conduit 34, the wiper arm is moved to a position at which the spring force balances the pressure force developed on the piston 35.

The wiper arm 37 is positioned to stroke a restsiance element 40. In series with the resistance element 40 and occupying a portion of the stroke of the wiper arm 37 is a conductor element 41 which has substantially zero resistance. The wiper arm 37 is electrically connected by means of a conductor 42 such that as it strokes upwardly along the resistance element 40, it shunts out an increasing portion of the resistance of the element 40.

The potentiometer resistance element 40 is connected in series with a second resistance element 43 to the output 50 of a voltage reference 45 which produces a fixed magnitude D.-C. output voltage. It will be observed that with the wiper arm 37 in the position shown by the dotted line, the output voltage of the reference 45 will be distributed as voltage drops across the two resistance elements 40 and 43 in accordance with their relative resistance values, thus establishing a particular potential at the point A for this condition.

It will be observed that over the portion of the stroke of the wiper arm 37 corresponding to the element 41, the potential at point A will remain unchanged because the resistance values of the elements 40 and 43 are not affected by movement of the wiper arm through this increment. However, as the arm 37 is moved upward beyond the element 41 and along the resistance element 40, an increasing portion of the resistance of element 40 is shorted out through the arm 37 and the conductor 42, thereby decreasing the resistance of that portion of the element 40 which is connected in series with the element 43.

As the series connected resistance of the element 40 is decreased, the voltage drop across it also decreases, while the voltage drop across the element 43 increases. The result is an increase in potential at point A. In other words, point A becomes more positive.

On the other hand, movement of the wiper arm 37 in a downward direction along the resistance element 40 increases the resistance of the series connected portion, thereby increasing the voltage drop across it and causing a decrease in the voltage drop across element 43. This causes a reduction in the potential at point A.

In view of the foregoing, it will be observed that as the drive pintle pressure is increased with increasing torque, there will occur an initial range of torques and corresponding pintle pressures which correspond to the stroke range of the arm 37 represented by the element 41, and over which the potential at point A is not affected by changes in drive pintle pressure. Once this range is exceeded, however, the wiper arm begins to move along the resistance element 40, and in this range, it will be observed that an increase in drive pintle pressure causes an increase in the potential at A and that a decrease in pintle pressure causes a decrease in the potential at A.

The output 44 of the excitation limiter 31 is connected to the summing block 25 in a direction such as to subtract from the regulator reference output signal 24. In practice, the summing action represented schematically by the summing block 25 may be achieved in a number of ways; for example, by applying the signals to separate input windings of the magnetic amplifier 27. Now it will be observed that as long as the drive torque as represented by pintle pressure is less than the preselected level required to move the wiper arm upwardly beyond the span of element 41 and on to the resistance element 40, the output voltage at A remains fixed, and hence throughout this range the output 44 of the excitation limiter 31 also remains fixed. It will also be observed that throughout the range of drive torques just specified, the voltage regulation system acts in the conventional manner with the error or corrective signal 26 representing the difference between the actual generator output voltage and the desired generator output voltage, subject, of course, to the steady state magnitude of the limiter output signal being balanced out by an adjustment in an output 24 of the regulator reference such that the net steady state input of the signals 24 and 44 to the summing block 25 represents the desired reference voltage.

However, if the drive torque increases beyond the above range such that the arm 37 is moved beyond the element 41, the series connected resistance of the element 40 is decreased, and the magnitude of the output signal 44 of the limiter 31 is correspondingly increased. The signal 44 is connected to the summing block 25 in the same sense as the signal 22 of the regulator sensing circuit. In other words, an increase in the signal 44 is equivalent to the signal which would be produced by an increase in generator output voltage; or, in other words, an increase in the magnitude of the signal 44 is in a direction calling for a decrease in the excitation level of the generator 12.

The range of drive output torques represented by the span of the element 41 is in this case selected to correspond to the range running up to 200 percent of normal rated output torque. Thus so long as the drive output torque does not exceed 200 percent, the output 44 of the limiter 31 remains constant and the operation of the voltage regulation system is not affected by variations in drive output torque. However, as the 200 percent torque level is exceeded, the generator excitation is automatically reduced to cause a reduction in generator output voltage.

Now it will be observed that the voltage regulation system will continue to function within the range where the limiter 31 becomes operative. This means that the gain or sensitivity of the limiter must be sufficiently high to overcome the signal 22 which may simultaneously be calling for an increase in excitation while the limiter is producing a signal calling for a decrease in excitation.

For example, under fault conditions, the terminal voltage of the generator 12 may be reduced to only a few percent of its rated level, thereby producing a very large signal at 22 calling for an increase in excitation. The gain of the limiter 31 must therefore be selected with considerations of this kind in mind such that the net signal produced at 22 and 44 provides the desired limiting action. Or, alternatively, blocking rectifiers may be used between the torque sensor and the regulator sensing circuit in the lines 22 and 44 such that the larger of the two signals will always control. Such techniques are well known to those skilled in the art.

It will be appreciated from the foregoing that we have provided an improved electrical generating system wherein generator excitation is controlled and limited as a function of the load on the drive. We thus satisfy the requirements of the electrical system without the necessity for incorporating in the drive the excess load capacity that would otherwise be required in a system where temperature compensation is not provided.

It will be appreciated that not all of the situations which result in generator output currents in excess of 200 percent rated current necessarily involve the imposition of loads on the drive which are in excess of 200 percent of rated drive output. For example, in certain types of faults the electrical power factor is so low that the real load imposed on the drive is actually less than the rated load even though the generator output current substantially exceeds 200 percent of the rated level. In situations of this kind, the voltage regulation system is limited only by its own capacity and may approach the characteristic illustrated by the curve 11 of FIG. 1 subject only to the condition that the preselected drive output torque above which limiting is set to occur is not exceeded.

While the embodiment presented utilizes a hydraulic drive, it will be apparent that our invention may be applied to other types of systems, such as those utilizing air turbine drives or the like. It will also be apparent that the drive torque signal may be extracted in other ways such as by measuring bearing reaction or shaft twist or in various other ways known to those skilled in the art.

In view of the foregoing, it will be seen that various modifications, changes and substitutions may be made in the embodiment presented herein without departing from the true scope and spirit of our invention as defined in the appended claims.

What we claim as new and desire to secure by Letters Patent of the United States is:

1. In an electrical generating system of the type having an electrical generator together with means for driving said generator and a voltage regulation system for controlling the excitation level of said generator to regulate the output voltage thereof; means for modifying the characteristics of said system as a function of the load on said drive comprising means producing a signal as a function of the output torque of said drive, and means connecting said signal to said voltage regulation system in a direction to reduce the excitation level of said generator when the output torque of said drive exceeds a preselected level.

2. An electrical generating system comprising an electrical generator, drive means for supplying driving power to said generator, a voltage regulation system for regulating the excitation level of said generator, means for sensing the output torque of said drive, and means for modifying the characteristics of said regulation system to reduce the excitation level of said generator as a function of drive output torque when the magnitude of said torque exceeds a preselected level.

3. An electrical generating system comprising an electrical generator, hydraulic drive means for transmitting a driving torque to said generator through a hydraulic medium from a power source, an excitation system for controlling the excitation level of said generator, means for sensing the magnitude of the pressure in said hydraulic medium through which the generator driving torque is transmitted to derive a signal proportional to the output torque of said drive, and means for controlling said excitation system in response to said pressure signal to limit the excitation level of said generator as a function of drive output torque.

4. In an electrical generating system of the type having an electrical generator together with a drive for supplying driving power to said generator and an excitation system for controlling the excitation level of said generator, an excitation limiting system comprising means for producing a first signal proportional to the output torque of said drive, means establishing a second signal representing a preselected magnitude of drive output torque, means for producing a third signal when the magnitude of said first signal exceeds the magnitude of said second signal, and means connecting said third signal to said excitation system in a direction to reduce the excitation level of said generator.

5. In an electrical generating system of the type having an electrical generator driven from a power source through a hydraulic drive in which the driving torque is transmitted through a hydraulic medium, and a voltage regulation system in which the generator excitation level is controlled to regulate the output voltage of said generator;

means for producing a signal proportional to the pressure of said hydraulic medium through which the generator driving torque is transmitted, and means connecting said pressure responsive signal and said voltage regulation system in a direction to reduce the excitation level of said generator when the pressure in said hydraulic medium exceeds a preselected level.

6. In an electrical generating system comprising an electrical generator together with a voltage regulation system for regulating the output voltage thereof, and a hydraulic drive for transmitting a drive torque from a power source to said generator through a hydraulic medium; an excitation limiter comprising means for producing a signal proportional to the magnitude of the pressure in said hydraulic medium through which the generator driving torque is transmitted, a voltage source producing an output voltage of substantially constant magnitude, a pair of electrical resistors connected in series across said voltage source, means for varying the magnitude of the resistance of one of said resistors as a function of said pressure responsive signal when the magnitude of said pressure responsive signal exceeds a preselected level, and means responsive to the change in the voltage division across said resistors produced by the variation in the resistance of one of said resistors to decrease the excitation level of said generator in response to an increase in said pressure responsive signal beyond said preselected level.

References Cited in the file of this patent
UNITED STATES PATENTS
720,661    Brown _____ Feb. 17, 1903